(12) United States Patent
Yang

(10) Patent No.: US 6,512,720 B1
(45) Date of Patent: Jan. 28, 2003

(54) UNDERWATER TELEMETRY METHOD USING DOPPLER COMPENSATION

(75) Inventor: Tsih Yang, Great Falls, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/145,618

(22) Filed: May 14, 2002

(51) Int. Cl.$^7$ .............................................. H04B 11/00
(52) U.S. Cl. ........................ 367/134; 367/131; 367/904
(58) Field of Search .............................. 367/131, 134, 367/904; 340/850

(56) References Cited

U.S. PATENT DOCUMENTS

| | | | |
|---|---|---|---|
| 4,187,491 A | * | 2/1980 | Lindstrum et al. ........... 367/904 |
| 4,905,211 A | * | 2/1990 | Mackelburg et al. ........ 367/134 |
| 5,301,167 A | | 4/1994 | Proakis et al. |
| 5,550,792 A | | 8/1996 | Crandall et al. |
| 5,559,757 A | | 9/1996 | Catipovic et al. |
| 5,732,044 A | * | 3/1998 | Jarvis .......................... 367/134 |
| 5,784,339 A | | 7/1998 | Woodsum et al. |
| 5,844,951 A | | 12/1998 | Proakis et al. |
| 6,130,859 A | | 10/2000 | Sonnenschein et al. |
| 6,292,433 B1 | | 9/2001 | Gilbert et al. |
| 6,323,823 B1 | | 11/2001 | Wong et al. |
| 2002/0012289 A1 | | 1/2002 | Gilbert et al. |

* cited by examiner

Primary Examiner—Ian J. Lobo (74) Attorney, Agent, or Firm—John J. Karasek; Lawrence G. Legg

(57) ABSTRACT

A method for Doppler compensation in a phase coherent underwater communications system includes the steps of receiving a communications signal from a plurality of underwater communications channels, where the signal consists of a sequence of raw data; then applying a Doppler estimation to the data; demodulating the raw data; low pass filtering the demodulated raw data; applying resampling and downsampling to the data at a fractional sampling rate, for n samples per symbol, and generating a synchronized, Doppler-phase-corrected output signal; then applying the synchronized, Doppler-phase-corrected fractionally sampled signal to a phase locked loop and equalizer; then comparing an estimated symbol with a decision symbol and updating a plurality of tap coefficients; and h) outputting decision symbols. The Doppler estimation is performed either by applying a concurrent sinusoidal signal in a different band than the band of the communications signal, and then applying a Fourier transform or adaptive spectral estimation over a duration larger that a packet length to thereby obtain the Doppler-shift frequency $f_{cd}$; or, by applying a beginning probe signal; applying an ending probe signal; applying a probe replica signal; cross-correlating the probe replica signal with the beginning probe signal and the ending probe signal using a matched filter processor; determining a difference of arrival time between the beginning and ending probe signals using the peaks of the cross-correlation outputs; taking a ratio of the difference of arrival time to a time difference of the beginning and ending probe signals to obtain a dilation/compression ratio due to the Doppler shift; and then obtaining the Doppler shift from the dilation/compression ratio.

19 Claims, 9 Drawing Sheets

PREFERRED EMBODIMENT

PREFERRED EMBODIMENT
*FIG.4*

UNDERWATER TELEMETRY METHOD USING DOPPLER COMPENSATION

TECHNICAL FIELD

This invention relates to a method for phase coherent underwater acoustic communications. More particularly, the invention relates to a method for underwater acoustic communications using an improved Doppler compensation algorithm to extend the communication data packet length and reduce the number of receiver channels per fixed data and bit error rate.

BACKGROUND ART

Phase Coherent Underwater Acoustic Communications (ACOMMS)

The ocean presents an acoustic communication channel, which is band-limited and temporally variable. Propagation in the horizontal can be severely influenced by macro and micro multipath variability. Vertical propagation is often less severely impacted by the multipath.

Incoherent communication schemes, using for example frequency shift keying (FSK) algorithms, are used for line of sight propagation conditions in which multipath has minimal impact on the signals of interest. At long ranges, symbol rates for incoherent communications are limited by the multipath symbol interference. Additional processing (such as error encoding) is often required to remove the bit errors (due to symbol interference). The available frequency band is limited by frequency fading.

Coherent communication schemes use the available bandwidth more efficiently and provide higher data rates than the incoherent schemes for horizontal transmission of signals in a multipath environment. The state of the art systems use a (recursive) minimum least-mean-square (MLMS) approach for equalizing and updating the channel. The MLMS approach requires a certain minimum signal-to-noise ratio (SNR) at the receivers, of typically 10–15 dB. Maximum data rate and minimum bit error rate depend critically on the temporal properties of the channel impulse response function. The recursive least square (RLS) algorithm is computationally intensive and only a limited number (typically <4) of channels can be supported by prototype systems for real time communications.

An algorithm for phase coherent acoustic communications is described in U.S. Pat. Nos. 5,301,167 and 5,844,951, incorporated herein by reference. The latter patent extends the algorithm from a single receiver to multiple receivers; it uses jointly a phase locking loop and channel equalizer to adaptively correct for the channel temporal variation to minimize bit errors. The communication signals are transmitted by grouping symbols into packets. Each packet begins with a short pulse (e.g., a Barker code of 13 symbols of binary phases) used for symbol synchronization and an initial estimate of the multipath arrival structure. It is followed by a data packet beginning with a training data set with known symbols to estimate the carrier frequency (shift) and train the equalizer. The equalizer is updated by estimating the symbol errors using either the known symbol as in the training data or a decision on the received symbol. The number of tap coefficients is estimated from the impulse response deduced from the probe/trigger pulse. Carrier frequency s estimated from the training data. The data are fractionally sampled, typically 2 samples per symbol, and the most popular schemes for signal modulation are binary phase shift keying (BPSK) and/or quadrature phase shift keying (QPSK) signals. Channel impulse response and equalizer update requires a minimal input signal-to-noise (SNR) ratio for minimal bit errors. Multiple receivers using spatial diversity are often required for successful communications.

Underwater Acoustic Communication Channel

The underwater acoustic communication channel is different from the RF channel in three respects: (1) the long multipath delay due to sound refraction and long duration of reverberation from the ocean boundary; (2) the severe signal fading due to time-variable transmission loss; and (3) the high Doppler spread/shift, i.e., the variability and offset of receiver frequency and phase relative to the transmitter resulting from the media and/or platform motion.

In regard to the latter effect, underwater acoustic communications often involve sources or receivers from a moving platform. The source motion induces a shift in the carrier frequency, called Doppler shift. In practice, the frequency encounters not only a shift but also a frequency broadening; the latter referred to as Doppler spread. The sources of Doppler spread are twofold: sound scattering from moving ocean surface waves which has a broad spectrum and random small jitter of platform motion. The Doppler spread determines the signal coherence time assuming that the equalizer is able to update itself within the given coherence time. Because of these differences, the various techniques for radio frequencies (RF) communications cannot be applied directly to underwater acoustic communications.

Wireless radio communications are by line of sight with some multi-paths by reflection from nearby building and structure. Multi-path interference can usually be removed by antenna beamforming using an antenna on a horizontal plane. The array configuration can be designed with element spacing and configurations based on a plane wave model: the array aperture determines the width of the beam and element spacing determines the level of the side-lobes. Multipath delays in underwater acoustic channels, however, can last tens to hundreds of milliseconds, causing inter-symbol interference to extend over tens to hundreds of symbols depending on the carrier frequency and symbol rate. Inter-symbol interference in RF channels is orders of magnitude less and thus easier to deal with. Doppler shift of carrier frequency in underwater acoustic channels is several orders of magnitude larger than that of the RF channel since the sound speed is many orders lower than the speed of light. Hence, carrier frequency identification and symbol synchronization are critical for underwater acoustic communication systems. In addition, Doppler spread is non-negligible in the underwater communication channel as sound propagates through a random ocean medium and scatters from moving surfaces. Doppler spread and frequency coherence bandwidth accordingly limit the maximum data rate of underwater acoustic communications in an ocean channel.

Because Doppler shift can be relatively large in underwater acoustic communication channels, errors in the Doppler shift estimation (the carrier frequency identification) can cause large phase errors in phase modulated symbols and mis-synchronization of the symbol sequence, as the signal bandwidth (consequently the symbol duration) also changes proportionally with the carrier frequency shift. The estimation of carrier frequency (shift) in the prior art using the training data is limited by the duration of the training data, N multiplied by T, where N is the total number of training symbols and T is the symbol duration, providing a frequency resolution of the order I/NT. This frequency resolution is usually not precise enough, resulting in a symbol synchronization error over time. As a result, the communication packet length is limited (e.g., $\leq 5$ sec at <5 kHz) beyond which the symbols are mis-aligned.

Ocean being a random medium with time varying surface boundary, acoustic signals propagating through the ocean encounter large random phase changes which must be removed or compensated for proper identification of phase modulated symbols. This was described above as the relatively large Doppler spread.

The channel equalizer can in principle track and compensate the random phase changes of each symbol. In reality, the equalizer requires tens of symbols to converge to a stable solution, as such it could not remove the random phase changes on a symbol-by-symbol basis. Thus a phase locking loop is used jointly with the channel equalizer to adaptively correct for the phase change and temporal variation of the channel impulse response. The coupling of the two operations produces a complicated inter-dependence between the phase compensation of the phase locked loop and the tap coefficients of the channel equalizer as they are being updated with the received symbol sequence. As a result, errors in Doppler shift estimation can cause a failure for the channel equalizer resulting in a high bit error rate. Spatial diversity using multiple receiver channels provides not only spatial diversity but also a minimization of the symbol phase errors by averaging the outputs of the feed forward loop over the multiple channels.

With an initial Doppler shift estimation from the training symbols, one can in principle improve the Doppler shift estimation using the decision symbols of the transmitted data, thereby improving the frequency resolution of the Doppler estimation. This scheme works well (as in RF using the pilot symbols) without the random ocean media effect. With the random ocean media effect, the phase changes of the symbols are no longer a manifestation of the (residue) Doppler shift alone, but a mixture of Doppler shift and ocean induced phase change in a complicated relationship as described above. The achievable frequency resolution is hard to estimate.

DISCLOSURE OF THE INVENTION

According to the invention, a method for Doppler compensation in a phase coherent underwater communications system includes the steps of: receiving a communications signal from a plurality of underwater communications channels, the signal comprising a sequence of raw data; then applying a Doppler estimation to the raw data, demodulating the raw data using the Doppler-shifted carrier frequency ($f_{cd}$); low pass filtering the data; downsampling and resampling the raw data to generate a synchronized, Doppler-phase-corrected output signal; then applying the synchronized, Doppler-phase-corrected output signal to a phase locked loop and equalizer; and then comparing an estimated symbol with a decision symbol and updating a plurality of tap coefficients. The Doppler estimation may be performed by either i) applying a concurrent sinusoidal signal in a different band than the band of the communications signal; and ii) applying a Fourier transform or adaptive spectral estimation over a duration larger that a packet length to thereby obtain a Doppler-shift frequency $f_{cd}$; or, by i) applying a beginning probe signal; ii) applying an ending probe signal; iii) applying a probe replica signal; iv) cross-correlating the probe replica signal with the beginning probe signal and the ending probe signal using a matched filter processor to generate a time series (e.g., a channel impulse response function); v) determine a difference of arrival time from the said cross-correlation outputs; vi) taking a ratio of the difference of arrival time to a time difference of said consecutive pulses in said communications signal to obtain a dilation/compression ratio due to the Doppler shift; and vii) obtaining the Doppler shift from the dilation/compression ratio.

The invention provides a scheme for fine-resolution average Doppler shift estimation over the communication packet, an algorithm for fast and accurate symbol synchronization, and a method for acoustic communications using a long packet, resulting an increased information data rate averaged over time.

Multiple receiver channels having a sufficient vertical aperture are usually required to minimize the bit error rate. The invention provides reduction in the minimum number of receiver channels required for fixed bit error rate and baud rate with the same input signal-to-noise ratio. Additional features and advantages of the present invention will be set forth in, or be apparent from, the detailed description of preferred embodiments which follows.

BEST MODE FOR CARRYING OUT THE INVENTION

This invention addresses the preferred methods of Doppler estimation and symbol synchronization and the effect of Doppler estimation error on the phase locked loop in a random ocean medium in that order.

The communication signal consists of a series of symbols, and each symbol has a duration of T. For phase shifted keying (PSK), the signal can be expressed as $$S = \sum_n e^{j2\pi f_c t_n} h(t_n - nT) A_n e^{j\varphi_n}$$

where h is a square time-window, which is non-zero only during the symbol duration; h is non-zero only when its argument is between 0 and T. The symbols are modulated by different phases $\varphi_n$. The effect of the Doppler is either a dilatation or elongation of the signal, $$D(S) = \sum_n e^{i2\pi f_{cd} t_n} h(\alpha(t_n - nT)) A_n e^{i\varphi_n} =$$

$$\sum_n e^{i2\pi f_c t_n} e^{i2\pi(f_{cd}-f_c)t_n} h(\alpha(t_n - nT)) A_n e^{i\varphi_n}$$

where $f_c$ is the carrier frequency, $f_{cd}$ is the Doppler shifted carrier frequency and $$\alpha = \frac{f_{cd}}{f_c}$$

is the Doppler ratio. Therefore, the effect of the Doppler is a phase correction (the $2^{nd}$ term of the above equation) and a dilation or elongation of the symbol duration. For an ideal channel, the phase locked loop requires that the phase angle error to satisfy $\Delta\phi_n < \pi$. The phase angle error is increased by the phase error due to Doppler estimation error. The phase error may violate the condition $(2\pi\Delta f_{cd}t + \Delta\phi_n) < \pi$.

The effect of platform motion on a broadband signal is more than just a shift in the carrier frequency, which is a narrowband explanation, i.e., when the bandwidth is significantly less than the carrier frequency. For a broadband signal, the dilation or elongation of a symbol results in a symbol synchronization error when the Doppler is not accurately estimated.

Per-symbol timing error due to the error in the Doppler estimation, $\Delta f_{cd}$, is given by:

$$\Delta T = T\left(\frac{\Delta f_{cd}}{f_c}\right)$$

This error is cumulative. The timing error at time t (counted from the $1^{st}$ symbol) is:

$$dt = \frac{t}{T}\Delta T = t\left(\frac{\Delta f_{cd}}{f_c}\right)$$

The symbol at time t will be out of sync when dt >T. For a QPSK signal at 3.5 kHz, with a baud rate of 500, one can determine the required accuracy of Doppler estimation as a function of packet length. The result is as follows:

TABLE 1

| Packet Length (sec) | $\Delta f_{cd}$ (Hz) |
| --- | --- |
| 5 | <1.4 |
| 10 | <0.7 |
| 20 | <0.35 |

The above result may be interpreted as follows. The percentage of dilation or compression is given by the ratio of platform speed and sound speed. If the correction is 0.1%, then the symbol synchronization will be off by one symbol after a thousand of symbols. From that one can estimate the effect of platform speed, and its variation on the synchronization error.

The channel equalizer uses in practice a fractional sampling rate, typically 2 samples per symbol. For the early part of the signal (e.g., <1000 symbols), the fractional (two) samples per symbol fall mostly within the dilated or compressed symbol durations despite the synchronization error.

The Doppler correction can be effectively treated by the phase correction due to a shift in the carrier frequency. For the latter part of the signal (e.g., symbols beyond a thousand), the symbol timing is off and symbol needs to be re-synchronized or else large bit error may result. For these reasons, current packet length is limited to a few thousand symbols.

In practice, the data digitization rate is fixed by the hardware. The fixed sampling rate will in most cases not synchronize with the dilated or compressed symbol rate to produce two samples per symbol, particularly where there is unknown Doppler correction. Hence the data needs to be re-sampled after a determination of the Doppler correction. Re-sampling for non-integer re-sample ratio involves a non-trivial calculation to be accurate. The phase errors due to incorrect Doppler estimation and inadequate re-sampling increase with the length of the communication packet.

Figure 1:
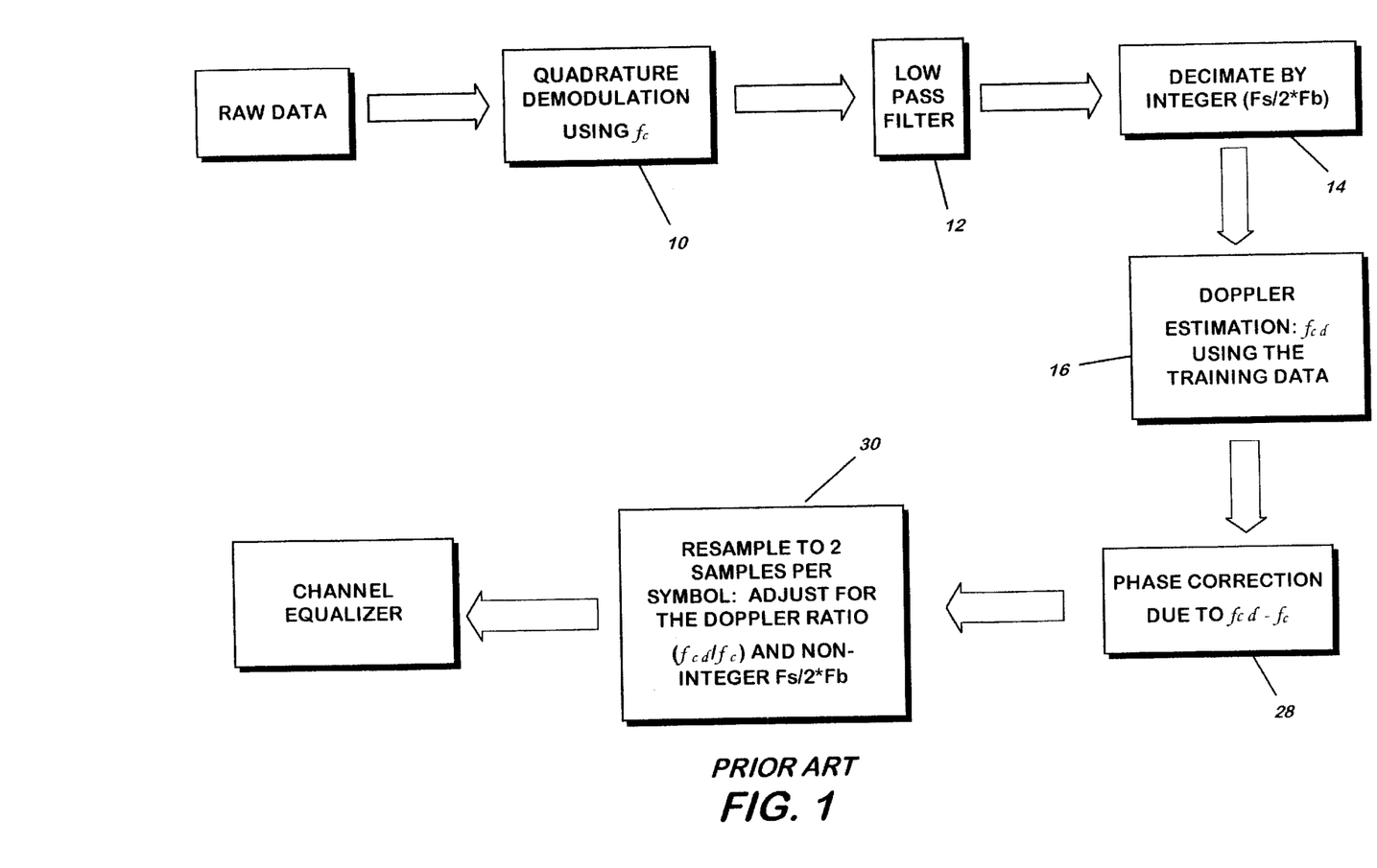
FIG. 1 show the flow chart of conventional processing for Doppler estimation and symbol synchronization and decimation.
Figure 2:
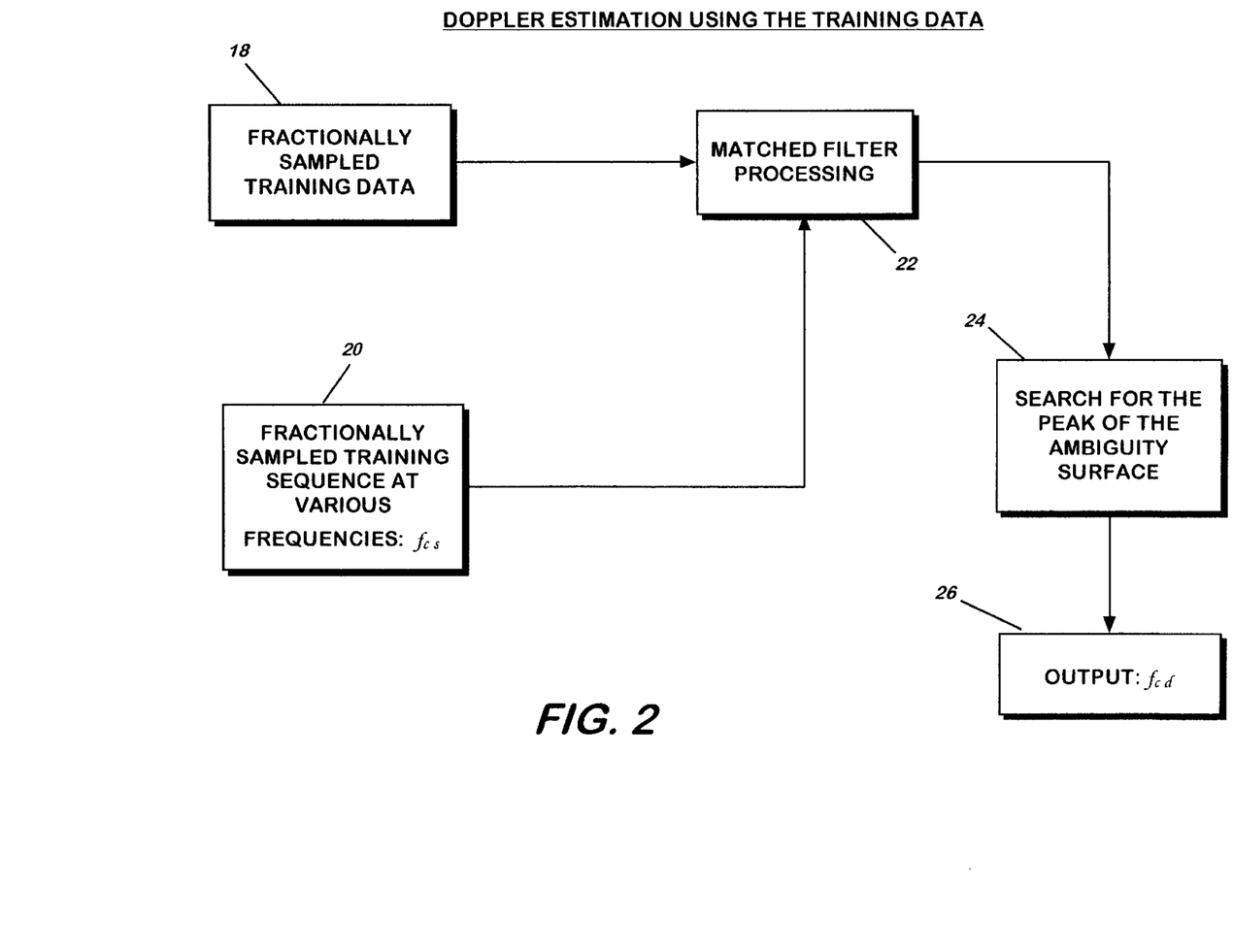
FIG. 2 shows the flow chart of Doppler estimation using the training data.

FIG. 1 illustrates a conventional Doppler compensation scheme. The phase coherent data is commonly processed as follows. The signal is down shifted from the pass band to the base band by quadrature demodulation 10 using the nominal carrier frequency (not Doppler corrected) $f_c$, and low pass filtered 12. The data is down sampled to approximately 2 samples per symbol by decimation 14 using integer(Fs/2*Fb) where Fs is the sampling frequency and Fb is the signal bandwidth. The early part of the fractionally sample data containing the training data are used to estimate the Doppler shift by cross correlating the training data with the fractionally sampled training sequence of known symbol sequence calculated using a range of expected Doppler frequencies 16. The Doppler estimation procedure is shown in FIG. 2 where the training data 18 is cross-correlated with the calculated Doppler-shifted training sequence using a range of Doppler frequencies $f_{cs}$. The cross-correlation process is also known as the matched filter processing 22, and is used to generate a two-dimensional ambiguity surface 24 as a function of the Doppler frequency shift and multipath delay time. The peak of the ambiguity surface is used to estimate 26 the Doppler frequency $f_{cd}$. The rest of the data are then corrected 28 for the phase error due to Doppler shift $f_{cd}-f_c$, and re-sampled 30 according to the Doppler ratio $f_{cd}/f_c$; the re-sampling also correct for the decimation error due to non-integer Fs/2*Fb. The width of the ambiguity surface peak in the frequency axis is the frequency resolution of the Doppler estimation. Assuming training data of N symbols, the training data lasts NT sec, which for QPSK at baud rate of 500 is 1 sec for N=500. The frequency resolution is then 1 Hz. Compared with Table 1 above, the packet length is limited to ~7 sec.

Figure 3:
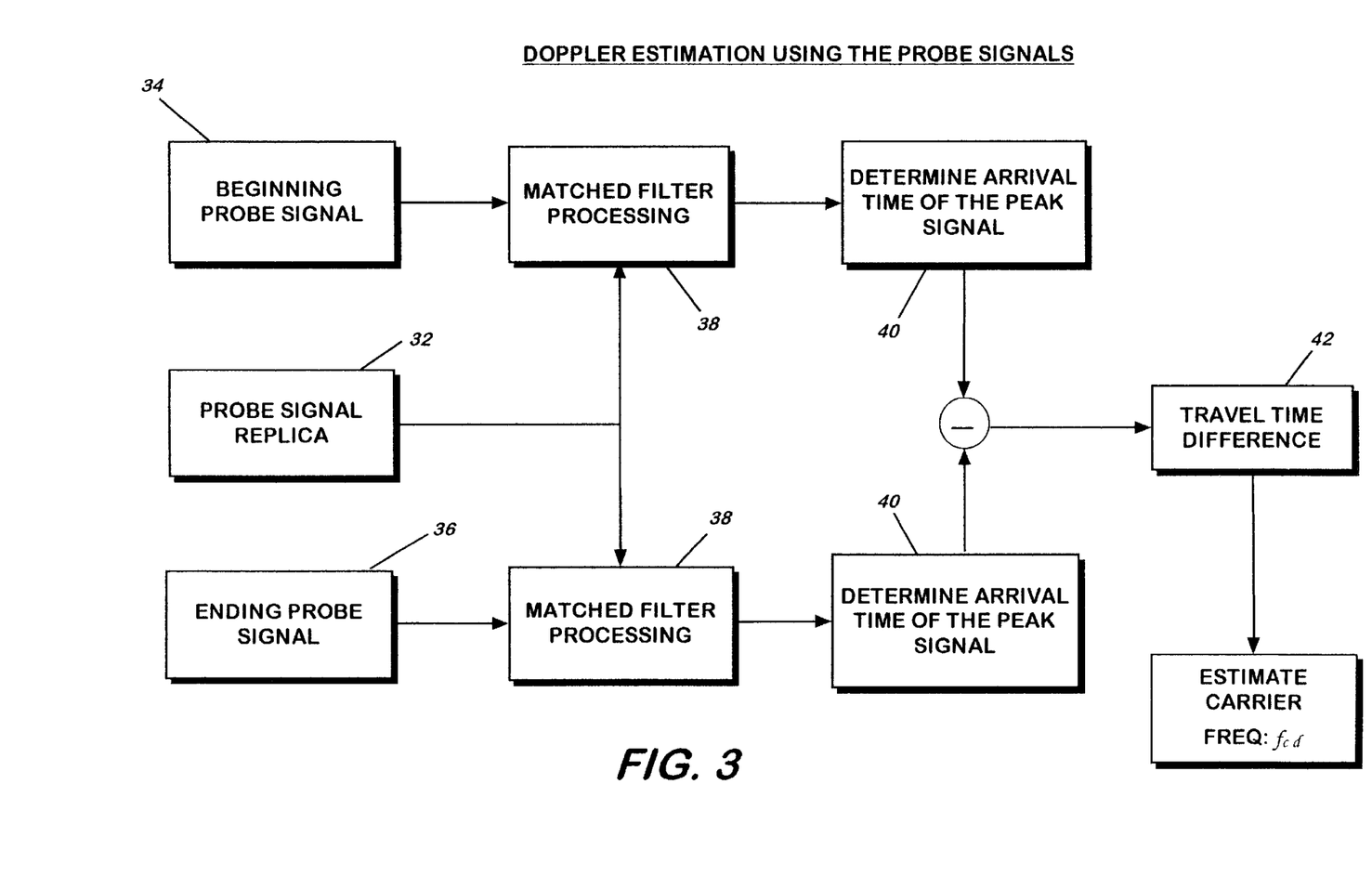
FIG. 3 shows the Doppler estimation using two probe signals.
Figure 4:
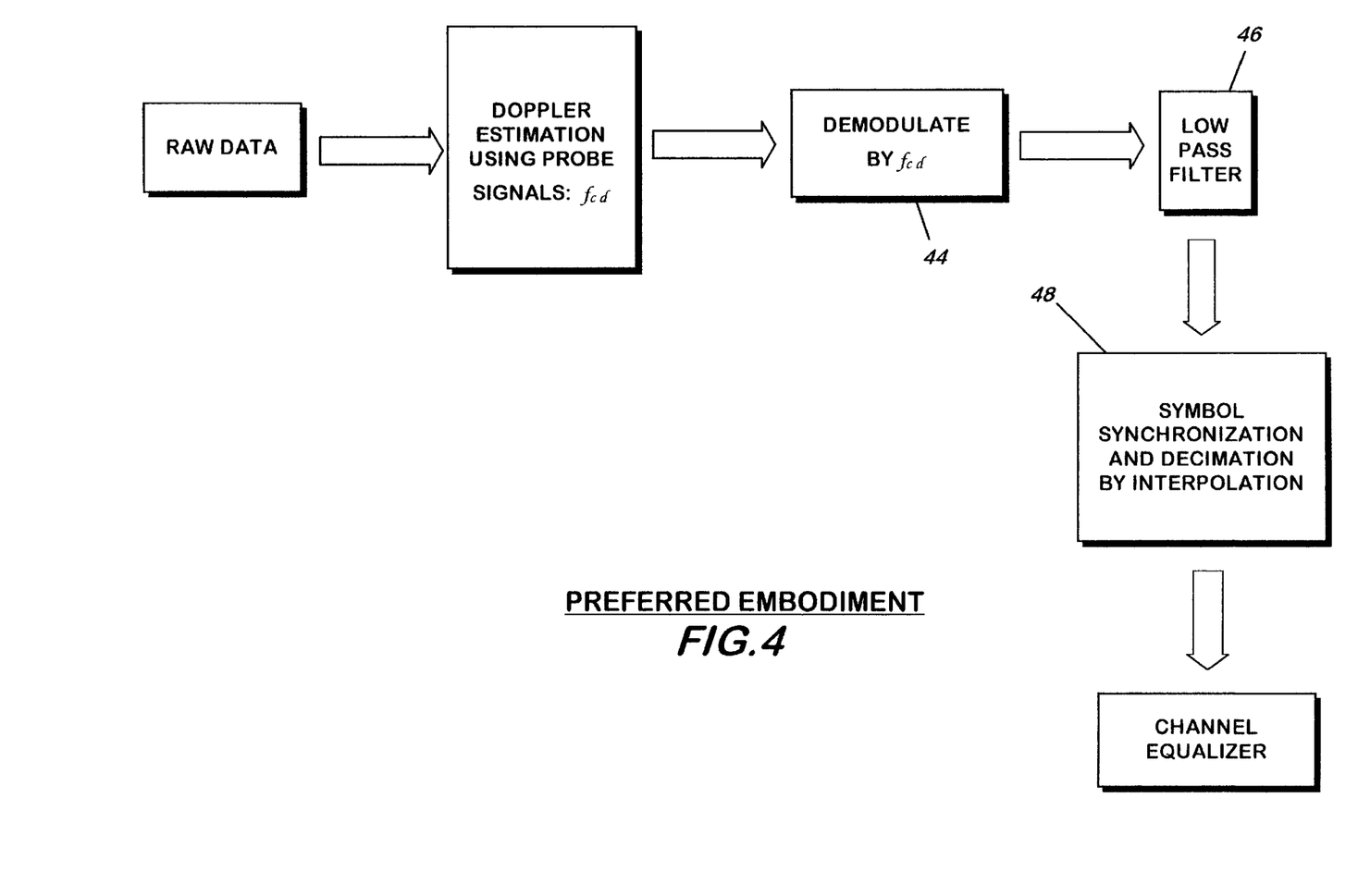
FIG. 4 shows the flow chart of the improved Doppler estimation and symbol synchronization according to the invention.

FIGS. 3 and 4 illustrate a preferred embodiment in accordance with the invention. In one embodiment, Doppler estimation uses a concurrent sinusoidal signal in a different band than the communication (QPSK) signal. The continuous sinusoidal signal is also called the pilot tone whose frequency has been shifted from $f_c$ to $f_{cd}$. Using a long time Fourier transform or adaptive spectral estimation over a duration larger than the packet length t, the peak of the frequency spectrum so obtained reveals the Doppler-shifted frequency $f_{cd}$. The frequency resolution of the signal is better than 1/t and thus satisfies the requirement given above. In another embodiment, two probe pulses that are insensitive to Doppler shift are used before and after the packet. Examples of Doppler insensitive pulses are hyperbolic and linear frequency modulated signals. The first probe pulse can be used as the trigger signal, which is nominally placed 300 msec before the communication (QPSK) data. The gap is to allow the multi-path returns so not to interfere with the communication data. Similarly the second pulse will be place at 300 msec after the communication data to allow for the multipath returns. Doppler shift can be measured by the travel time difference between the two pulses. The flow chart of this processor is shown in FIG. 3. In this embodiment, only one replica probe signal, 32, is used which is the known transmitted probe signal. There is no need to generate many different replica signals using a range of expected Doppler frequencies (as in FIG. 2) since the correlation of this type of signals is Doppler insensitive. The replica signal 32 is cross-correlated with the beginning probe signal 34 and ending probe signal 36 using the matched filter processor 38. The output of the matched filter processor 38 is approximately the channel impulse response function. In one implementation, the peak of each channel impulse response function is used to estimate the arrival time 40 of each (beginning and ending) pulse 34 and 36, from which the difference of the arrival time 42 is obtained. The ratio of the measured arrival time difference and the time difference of the two pulses in the original transmitting signal is the dilatation/compression ratio due the Doppler shift. It is equal to the Doppler ratio $f_{cd}/f_c$. From the measured dilation/compression ratio, one determines the Doppler frequency $f_{cd}$. Since the time separation of the two probe pulses is larger than the length t of the communication data, the Doppler resolution is automatically better than 1/t, which therefore automatically satisfies the requirement as laid out above (see Table 1). Accordingly, the communication packets can be extended to double, triple and quadruple the current packet length.

The preferred embodiment uses a simple interpolation procedure for symbol synchronization and decimation to the fractional sampling rate of e.g, 2 samples per symbol. The flow chart is shown in FIG. 4. Symbol synchronization and fractional sampling of the data (data decimation to 2 samples per symbol) are performed in the base band. The data is quadrature demodulated 44 to the base band using the Doppler frequency $f_{cd}$ estimated from, for example, the two probe pulses 34 and 36. The data is low pass filtered 46. Symbol synchronization and data decimation 48 are done simultaneously by a simple interpolation procedure. A new data sample is obtained for each fractionally-sampled sample using two data samples before and after the expected location of the fractionally-sampled sample based on the expected sample arrival time relative to the first sample of the first symbol using the measured Doppler shift. For example, for sampling rate of Fs, and symbol bandwidth of Fb, the transmitted signal contains L=Fs/Fb samples per symbol. The received signal contains L'=αFs/Fb samples, where α is Doppler ratio defined above and is usually close to one. The beginning of the nth symbol is then given by nL' from the first sample of the first symbol, which lies in the digitized data between k=integer(nL') and k+1 samples. One needs only then interpolate the k and k+1 samples to obtain the first sample for the k-th Doppler-shifted symbol since the data is highly sampled at a rate of Fs. One can do the same thing for the second sample of the k-th symbol according to the fractional sample rule. For 2-samples per symbol, the second sample will be αT/2 sec later, where T is the symbol duration as defined above. The advantage of this procedure lies in the simple algebraic formula for symbol timing; there is no need for a sophisticated re-sampling algorithm which re-sample all the (decimated) samples. This simple procedure is very efficient and more accurate as compared to re-sampling algorithms used previously based on the fractionally (decimated) data which use either the chirped-Z transform or poly-phase filter method.

The above estimation of the Doppler shift, because of the improved frequency resolution, improves the performance of the phase locked loop in the presence of random phase fluctuations in the signal induced by the random ocean media. This improvement minimizes the number of receiver channels used in multi-channel equalizer for fixed bit error rate and data rate. The performance of the phase locked loop is dependent on the ocean environment and is not easily calculable by an analytic approach. It can be illustrated using a computer simulation model incorporating the ocean propagation physics.

Figure 5:
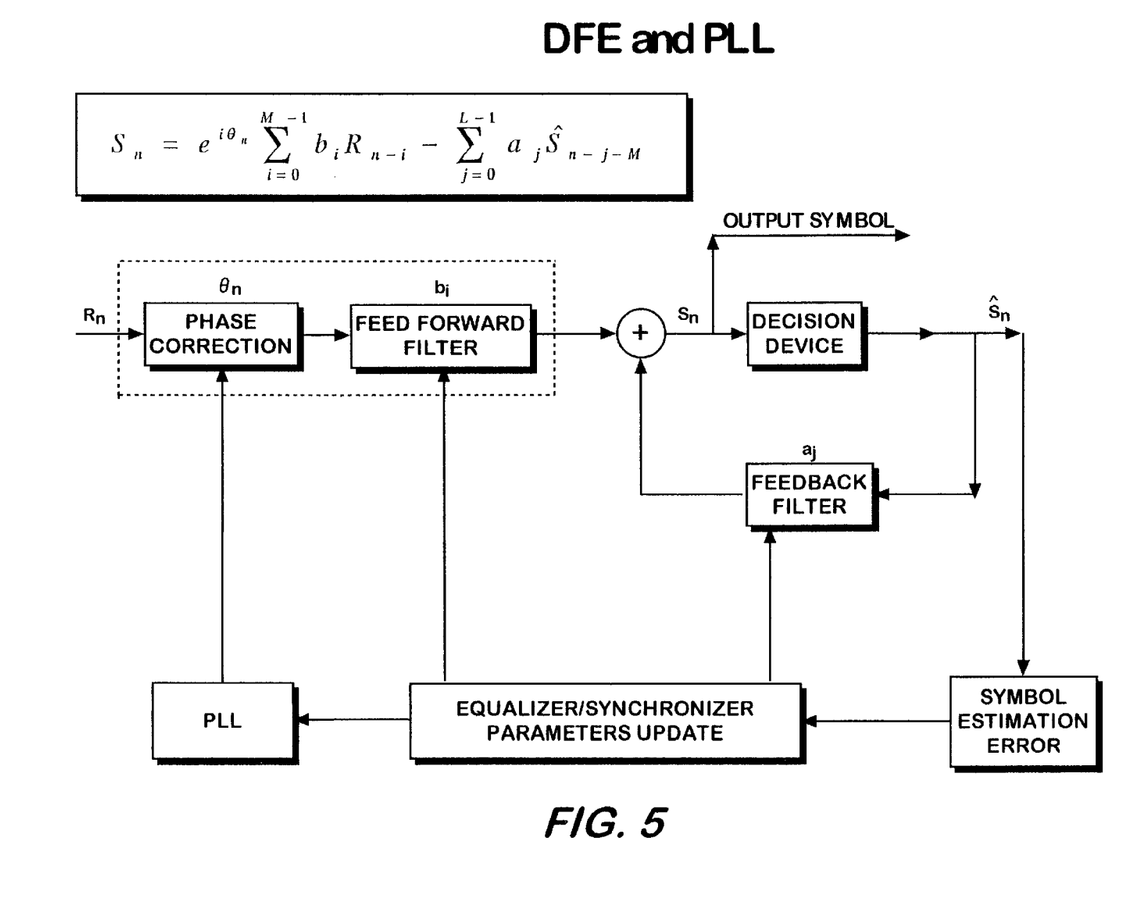
FIG. 5 shows a schematic diagram of a conventional decision feedback equalizer and a conventional phase locked loop.

For phase-modulated signals, the signal phase fluctuation is a key variable that will impact the algorithm performance. Referring now to FIG. 5, which shows a decision feedback equalizer (DFE) and a phase locked loop (PLL) such as is described in U.S. Pat. No. 5,301,167, incorporated herein by reference, the PLL is intended to remove the residue phase error due to Doppler shift error and/or random phase fluctuations due to the ocean environment. The received base band data $R_n$, where n denotes the nth symbol, are multiplied by a phase correction term, $e^{i\Theta n}$, and followed by a feed forward loop and a feedback loop, $$S_n = e^{i\Theta_n} \sum_{i=0}^{M-1} b_i R_{n-i} - \sum_{j=0}^{L-1} a_j \hat{S}_{n-j-M}$$

where a and b are the tap coefficients of the feedback and feed forward loop, and $\hat{S}_n$ denotes either the known symbol of the decision symbol (or the training symbol during the training phase). As shown in FIG. 5 the output of the feed forward loop and feedback loop yields an estimated symbol $S_n$ that is passed through a decision device which determines the identification of the symbol. The error between the estimated symbol and the decision symbol is used to adjust the tap coefficients of the feed forward and feedback loop. The phase error between the estimated symbol and the decision symbol are updated by the phase lock loop and is then applied to the next symbol. As remarked above, the origin of the phase error comes from error in the Doppler shift and/or the phase changes induced by the random ocean medium.

The ocean induces random phase changes for each symbol as manifested by the Doppler spread. The purpose of the PLL is to remove the phase fluctuation at the symbol rate, which the equalizer is not able to track as the equalizer usually takes tens of symbols to converge. Common practice is to use a second order PLL, such as is described in U.S. Pat. No. 5,301,167. The problem is that the ability of the second order PLL in removing the phase fluctuation is also limited. As the channel response and its rate of fluctuation vary from ocean to ocean, it is not readily apparent how to predict the effect of the acoustic environment on the performance of the DFE and PLL. Underwater signal fluctuations, unfortunately, do not follow simple statistical distributions; therefore an empirical model is inadequate.

The effect of phase fluctuation due to random ocean on the performance of the second order PLL can be illustrated using an ocean propagation model. The results illustrate the limitation of the PLL in removing the random phase in the signal, used in conjunction with the channel equalizer. The phase change of the signal is represented in terms of a phase spectrum, which is the Fourier transform of the phase change with respect to time.

$$\phi(\omega) = FFT(\phi(t))$$

Figure 6:
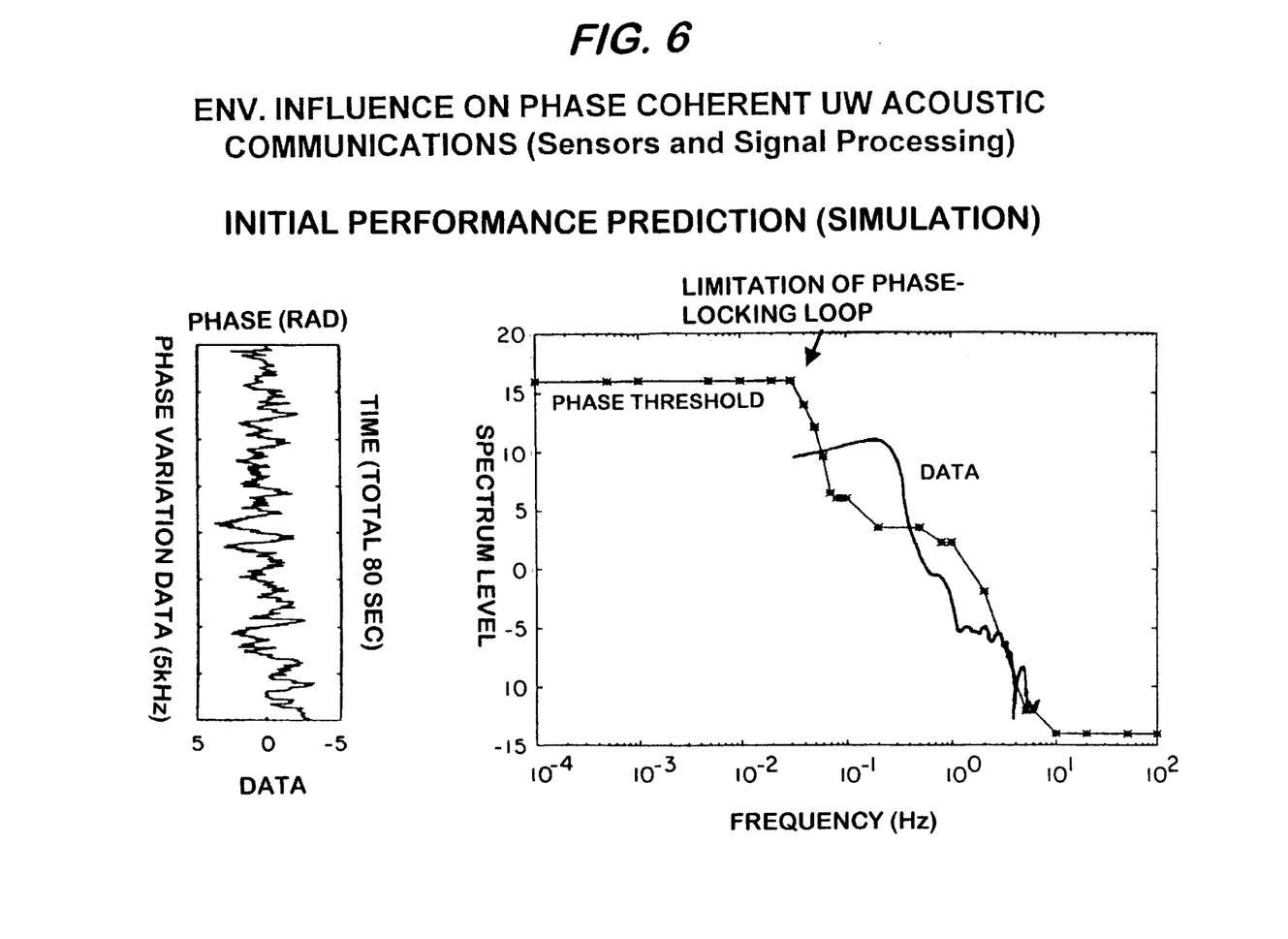
FIG. 6 shows an example of phase variation time series (left) and its spectrum (right) as well as a numerical estimation of the maximum phase spectrum that can be tolerated by the phase locked loop (right figure).

An example of the phase time series is given on the left side of FIG. 6. The spectral density. obtained by Fourier transform of the time series is shown on the right side of FIG. 6 as denoted by "data". To compare with this data, we show the simulation results of the PLL performance by increasing the random phases in the acoustic signal propagating through a shallow water channel until a high bit error (>1–10%) rate is encountered, keeping the channel impulse response function constant over the packet length. The result of maximum phase spectrum tolerable by the PLL is shown on the right side (denoted as "phase threshold") of FIG. 6. One finds that the impact of the phase change depends not only on the intensity (spectral density) but also on the rate of phase change (spectrum frequency). The amount of phase change tolerable by the PLL (used in conjunction with the equalizer) is a function of the frequency at which the phase changes. Accordingly, the PLL algorithm can tolerate more of the slow rate phase changes and less of the fast rate phase changes.

Figure 7:
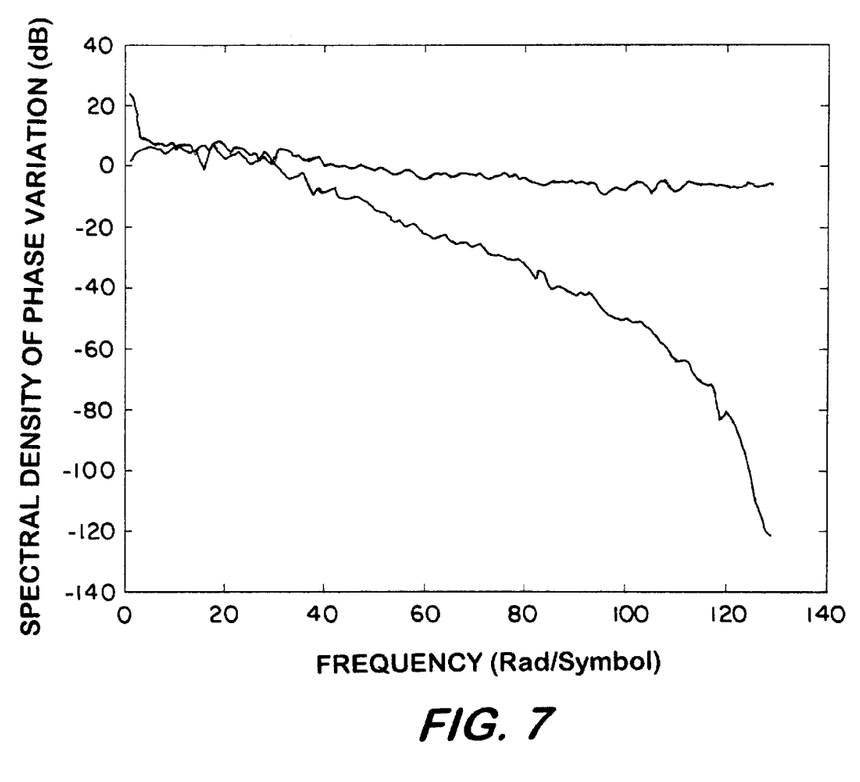
FIG. 7 shows the spectral density of the phase variation without Doppler estimation error (lower curve) and with Doppler estimation error (upper curve) in an ocean environment.

When the Doppler shift is incorrectly estimated, as discussed above, it produces a phase change increasing linearly with time which will exceed $2\pi$. Since the phase change is only known modular to $2\pi$, the linear phase change and the phase change induced by the ocean can no longer be unambiguously separated, to the extent that the resulting phase spectral density will exceed that tolerable by the PLL. FIG. 7 shows an example of how the spectral density of the ocean generated phase variation (lower curve) is modified by the Doppler estimation error to a higher level (upper curve) when the residue Doppler phase changes over many cycles of $2\pi$ within a packet. The higher spectral density may raise the phase correction above the threshold tolerable by the phase locked loop (compare with FIG. 6), in that case bit error are to be expected. Precise Doppler estimation is required to remove the phase change due to the Doppler shift in the data before the data are processed by the PLL and the channel equalizer so that the residue phase errors do not exceed the limit set by the PLL.

Figure 8:
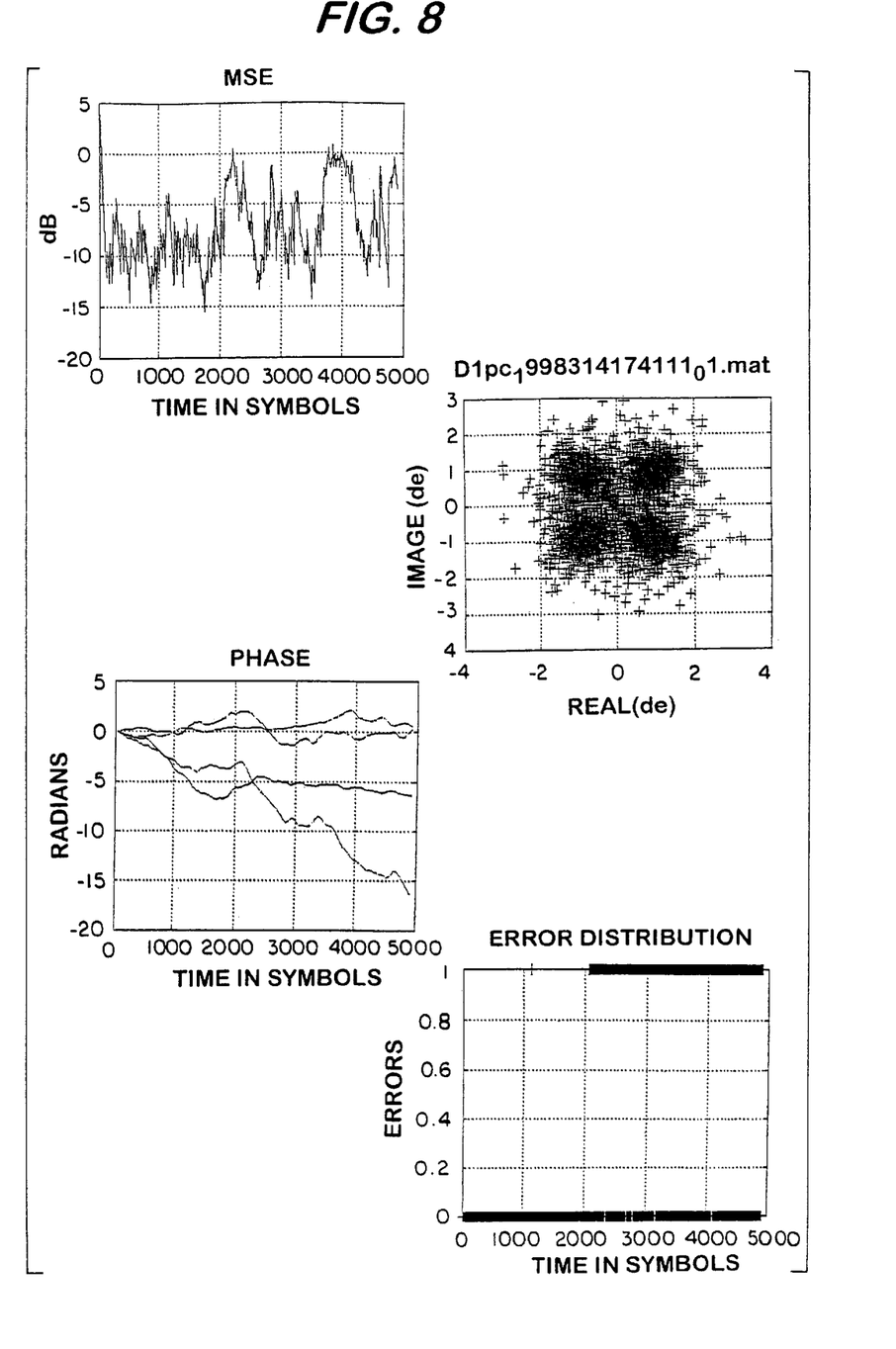
FIG. 8 shows the results of 4 channel spatial diversity processing based on re-sampling of fractional sampled data.
Figure 9:
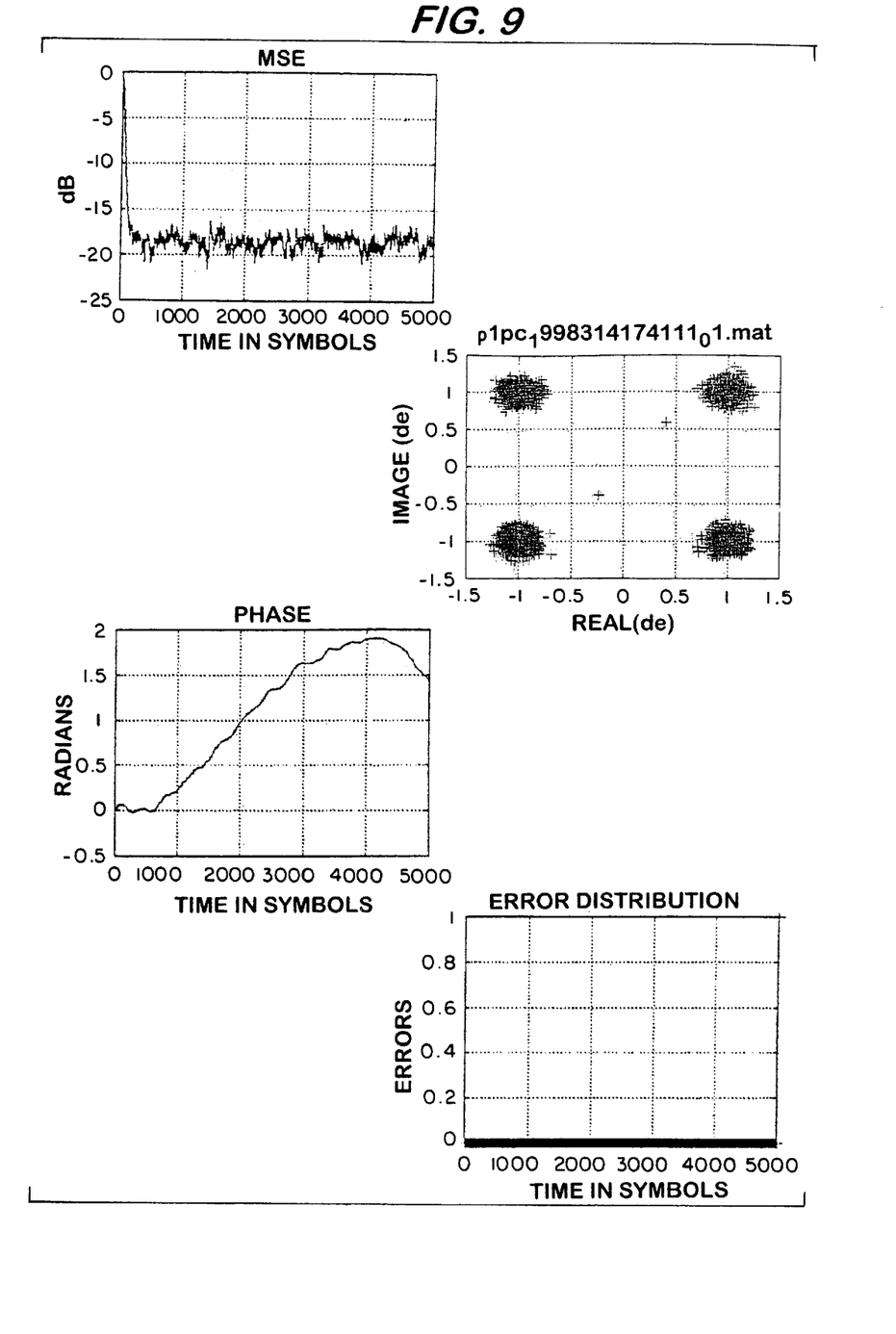
FIG. 9 shows the data as for FIG. 4 processed with the improved synchronization algorithm using the measured Doppler shift according to the invention.

FIGS. 8 and 9 show a comparison of the processing results using the conventional approach and the algorithm of the invention as described above. The carrier frequency is 3.5 kHz and the baud rate is 500 symbols/sec. Four channels are required to minimize bit errors using spatial diversity and the processor breaks down after ~5 sec. Using the algorithm of the invention, one channel is sufficient and the entire 10 sec of data is processed with minimal errors.

The algorithm of the invention is based on inferences drawn from a simulated performance limit of the PLL in a shallow water channel. By removing the phase due to Doppler, the residual phase drops below the phase threshold curve. The actual phase spectrum, however, is not easily deducible from the data. Note that the phase threshold curve is likely ocean dependent and also dependent on the equalizer algorithm used.

Extending the packet length significantly increases the average information data rate, although the burst data rate (the data rate per packet) remains the same. The reason is that communication packets are transmitted with duty cycle less than 100%. For equal gaps between packets increasing the packet length improved average data rate over a period of time.

Modifications and variations of the present invention are possible in the light of the above teachings. It is therefore to be understood that the scope of the invention should be determined by referring to the following appended claims.

I claim:

1. A method for Doppler compensation in a phase coherent underwater communications system, comprising the steps of:
   a) receiving a communications signal from a plurality of underwater communications channels, said signal comprising a sequence of raw data;
   b) then applying a Doppler estimation to said data, said Doppler estimation performed according to the steps of:
      i) applying a concurrent sinusoidal signal in a different band than the band of the communications signal; and
      ii) applying a Fourier transform over a duration larger that a packet length to thereby obtain a Doppler-shift frequency $f_{cd}$;
   c) demodulating the raw data using the $f_{cd}$;
   d) low pass filtering the demodulated raw data;
   e) applying resampling and downsampling to the data at a fractional sampling rate, for n samples per symbol, and generating a synchronized, Doppler-phase-corrected output signal, according to the steps of
      i) determining a fractional sampling time at multiple intervals of $1/(n*f_{cd})$; and
      ii) resampling the data by interpolating between two sample points of the data before and after the said multiple intervals;
   f) then applying the synchronized, Doppler-phase-corrected fractionally sampled signal to a phase locked loop and equalizer;
   g) then comparing an estimated symbol with a decision symbol and updating a plurality of tap coefficients; and
   h) outputting decision symbols.

2. A method as in claim 1, further comprising the step of low-pass filtering the resampled raw data prior to downsampling.

3. A method as in claim 1, wherein the downsampling produces about 2 samples per symbol.

4. A method as in claim 1, further comprising the steps of:
   determining a residue phase error; and
   applying a residue phase error correction factor to the output signal.

5. A method as in claim 1, further comprising the steps of:
   applying the Doppler shift to the communications signal raw data using quadrature demodulation to obtain a demodulated Doppler-adjusted data;
   applying the demodulated Doppler-adjusted data to a low pass filter to obtain a filtered output data; and
   performing symbol synchronization and fractional sampling of the filtered output data in the base band to produce an output signal substantially corresponding to the received communications signal.

6. A method as in claim 1, further comprising the step of transmitting an underwater signal responsive to the communications signal to thereby establish a two-way acoustic underwater communications channel.

7. A method for Doppler compensation in a phase coherent underwater communications system, comprising the steps of:
   a) receiving a communications signal from a plurality of underwater communications channels, said signal comprising a sequence of raw data;
   b) then applying a Doppler estimation to said data, said Doppler estimation performed according to the steps of:
      i) applying a beginning probe signal;
      ii) applying an ending probe signal;
      iii) applying a probe replica signal;
      iv) cross-correlating the probe replica signal with the beginning probe signal and the ending probe signal using a matched filter processor;

v) determining a difference of arrival time between the beginning and ending probe signals using the peaks of the cross-correlation outputs;

vi) taking a ratio of the difference of arrival time to a time difference of said beginning and ending probe signals to obtain a dilation/compression ratio due to the Doppler shift; and vii) obtaining the Doppler shift from the dilation/compression ratio;

c) demodulating the raw data using the $f_{cd}$;

d) low pass filtering the demodulated raw data;

e) applying resampling and downsampling to the data at a fractional sampling rate, for n samples per symbol, generating a synchronized, Doppler-phase-corrected output signal, according to the steps of:

ii) determining a fractional sampling time at multiple intervals of $1/(n*f_{cd})$; and ii) resampling the data by interpolating between two sample points of the said data before and after the said multiple intervals;

f) then applying the synchronized, Doppler-phase-corrected fractionally sampled signal to a phase locked loop and equalizer;

g) then comparing an estimated symbol with a decision symbol and updating a plurality of tap coefficients; and h) outputting decision symbols.

8. A method as in claim 7, further comprising the step of low-pass filtering the resampled raw data prior to downsampling.

9. A method as in claim 7, wherein the downsampling produces about 2 samples per symbol.

10. A method as in claim 7, further comprising the steps of:

determining a residue phase error; and applying a residue phase error correction factor to the output signal.

11. A method as in claim 7, further comprising the steps of:

applying the Doppler shift to the communications signal raw data using quadrature demodulation to obtain a demodulated Doppler-adjusted data;

applying the demodulated Doppler-adjusted data to a low pass filter to obtain a filtered output data; and performing symbol synchronization and fractional sampling of the filtered output data in the base band to produce an output signal substantially corresponding to the received communications signal.

12. A method as in claim 7, further comprising the steps of:

determining a residue phase error; and applying a phase error correction factor to the output signal.

13. A method as in claim 7, further comprising the step of transmitting an underwater signal responsive to the communications signal to thereby establish a two-way acoustic underwater communications channel.

14. A method for Doppler compensation in a phase coherent underwater communications system, comprising the steps of:

a) receiving a communications signal from a plurality of underwater communications channels, said signal comprising a sequence of raw data;

b) then applying a Doppler estimation to said data, said Doppler estimation performed according to the steps of:

i) applying a concurrent sinusoidal signal in a different band than the band of the communications signal; and ii) applying adaptive spectral estimation over a duration larger that a packet length to thereby obtain a Doppler-shift frequency $f_{cd}$;

c) demodulating the raw data using the $f_{cd}$;

d) low pass filtering the demodulated raw data;

e) applying resampling and downsampling to the data at a fractional sampling rate, for n samples per symbol, and generating a synchronized, Doppler-phase-corrected output signal, according to the steps of iii) determining a fractional sampling time at multiple intervals of $1/(n*f_{cd})$; and ii) resampling the data by interpolating between two sample points of the data before and after the said multiple intervals;

f) then applying the synchronized, Doppler-phase-corrected fractionally sampled signal to a phase locked loop and equalizer;

g) then comparing an estimated symbol with a decision symbol and updating a plurality of tap coefficients; and h) outputting decision symbols.

15. A method as in claim 14, further comprising the step of low-pass filtering the resampled raw data prior to down-sampling.

16. A method as in claim 14, wherein the downsampling produces about 2 samples per symbol.

17. A method as in claim 14, further comprising the steps of:

determining a residue phase error; and applying a residue phase error correction factor to the output signal.

18. A method as in claim 14, further comprising the steps of:

applying the Doppler shift to the communications signal raw data using quadrature demodulation to obtain a demodulated Doppler-adjusted data;

applying the demodulated Doppler-adjusted data to a low pass filter to obtain a filtered output data; and performing symbol synchronization and fractional sampling of the filtered output data in the base band to produce an output signal substantially corresponding to the received communications signal.

19. A method as in claim 14, further comprising the step of transmitting an underwater signal responsive to the communications signal to thereby establish a two-way acoustic underwater communications channel.

* * * * *